United States Patent [19]
Lin

[11] Patent Number: 5,791,721
[45] Date of Patent: Aug. 11, 1998

[54] MOTORIZED SUN SCREEN FOR COVERING A VEHICLE WINDOW

[76] Inventor: Yung-Ching Lin, No. 8, Lane 762, Chun-Shan N. Road, Yung-Kang City, Tainan Hsien, Taiwan

[21] Appl. No.: 672,087

[22] Filed: Jun. 27, 1996

[51] Int. Cl.$^6$ .................................................. B60J 3/00
[52] U.S. Cl. .................. 296/97.8; 296/97.4; 160/370.22; 160/265; 160/314; 160/75
[58] Field of Search ................................ 296/97.8, 97.4; 160/370.22, DIG. 3, 265, 310, 311, 313, 314, 68, 75

[56] References Cited

U.S. PATENT DOCUMENTS

| | | | |
|---|---|---|---|
| 5,468,040 | 11/1995 | Hsieh et al. | 296/97.8 X |
| 5,562,144 | 10/1996 | Ming-Shum | 296/97.8 X |
| 5,615,729 | 4/1997 | Matsumoto et al. | 296/97.8 X |

FOREIGN PATENT DOCUMENTS

| | | | |
|---|---|---|---|
| 240747 | 10/1987 | European Pat. Off. | 296/97.8 |
| 94025300 | 11/1994 | WIPO | 296/97.8 |

*Primary Examiner*—Joseph D. Pape
*Attorney, Agent, or Firm*—Christensen O'Connor Johnson & Kindness PLLC

[57] ABSTRACT

A motorized sun screen for covering a vehicle window has a base unit and a screen unit which includes a lower horizontal rod mounted rotatably on the base unit, an upper horizontal shaft and a screen with a bottom edge connected to the horizontal rod and a top edge connected to the horizontal shaft. Each of a pair of pivot arms has a lower end portion mounted pivotally on the base unit and an upper end portion slidably engaging the horizontal shaft. An extension spring has two ends connected respectively to the lower end portion of the pivot arms. A drive unit is mounted on the base unit and includes a motor with a rotatable drive shaft which is coupled to one end of the horizontal rod. The motor is operable in a first mode, wherein the motor permits the extension spring to contract, thereby causing the pivot arms to pivot away from each other to move the horizontal shaft upwardly and stretch the screen. In a second mode, the motor causes the horizontal rod to rotate, thereby winding the screen around the horizontal rod. As the screen is being wound, the pivot arms pivot toward each other moving the horizontal shaft downwardly and the extension spring tenses.

8 Claims, 6 Drawing Sheets

5,791,721

MOTORIZED SUN SCREEN FOR COVERING A VEHICLE WINDOW

BACKGROUND OF THE INVENTION

1. Field of the Invention

The invention relates to a vehicle sun screen, more particularly to a motorized vehicle sun screen.

2. Description of the Related Art

Referring to FIG. 1, a conventional vehicle sun screen 1 is shown to comprise a stationary rod 10, a roller 11 mounted rotatably on the rod 10, and a screen 12 wound on the roller 11. A fastener 13 is attached to a distal edge of the screen 12. Each of a pair of retainers 14 is formed with a cavity 141 and has a base 142 that is formed with through holes 143.

Referring to FIG. 2, in use, the two ends of the rod 10 are extended into the cavity 141 in the respective retainer 14, and screws 15 extend through the through holes 143 in the base 142 of the retainers 14 so as to mount the retainers 14 on a vehicle body 16 adjacent to a rear windshield of the vehicle. The sun screen 1 further includes a hook member 17 secured to a roof of the vehicle. When the fastener 13 is pulled, the screen 12 is stretched and can be engaged with the hook member 17, thereby covering the rear windshield of the vehicle.

It is noted that the conventional sun screen 1 is inconvenient to use, especially by the driver of the vehicle, since the fastener 13 has to be manually operated so as to engage or disengage the hook member 17.

SUMMARY OF THE INVENTION

Therefore, the object of the present invention is to provide a motorized vehicle sun screen which can overcome the aforementioned drawback of the prior art.

According to the present invention, a motorized sun screen for covering a vehicle window comprises: a base unit; a screen unit including a lower horizontal rod mounted rotatably on the base unit, an upper horizontal shaft and a screen with a bottom edge connected to the horizontal rod and a top edge connected to the horizontal shaft; a pair of pivot arms, each of which has a lower end portion mounted pivotally on the base unit and an upper end portion slidably engaging the horizontal shaft; an extension spring having two ends connected respectively to the lower end portion of the pivot arms; and a drive unit mounted on the base unit.

The drive unit includes a motor with a rotatable drive shaft which is coupled to one end of the horizontal rod. The motor is operable in a first mode, wherein the extension spring approaches a normal state and the pivot arms pivot away from each other to move the horizontal shaft upwardly and stretch the screen, and in a second mode, wherein the extension spring approaches a tensed state and the pivot arms pivot toward each other to move the horizontal shaft downwardly and permit winding of the screen on the horizontal shaft. The drive unit further includes a control unit connected electrically to the motor. The control unit is operable so as to control operation of the motor in the first and second modes and includes a solar collector plate for collecting solar energy, a converter circuit connected to the solar collector plate for converting the solar energy collected by the solar collector plate into electrical energy, and a switch control circuit which interconnects the converter circuit and the motor.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
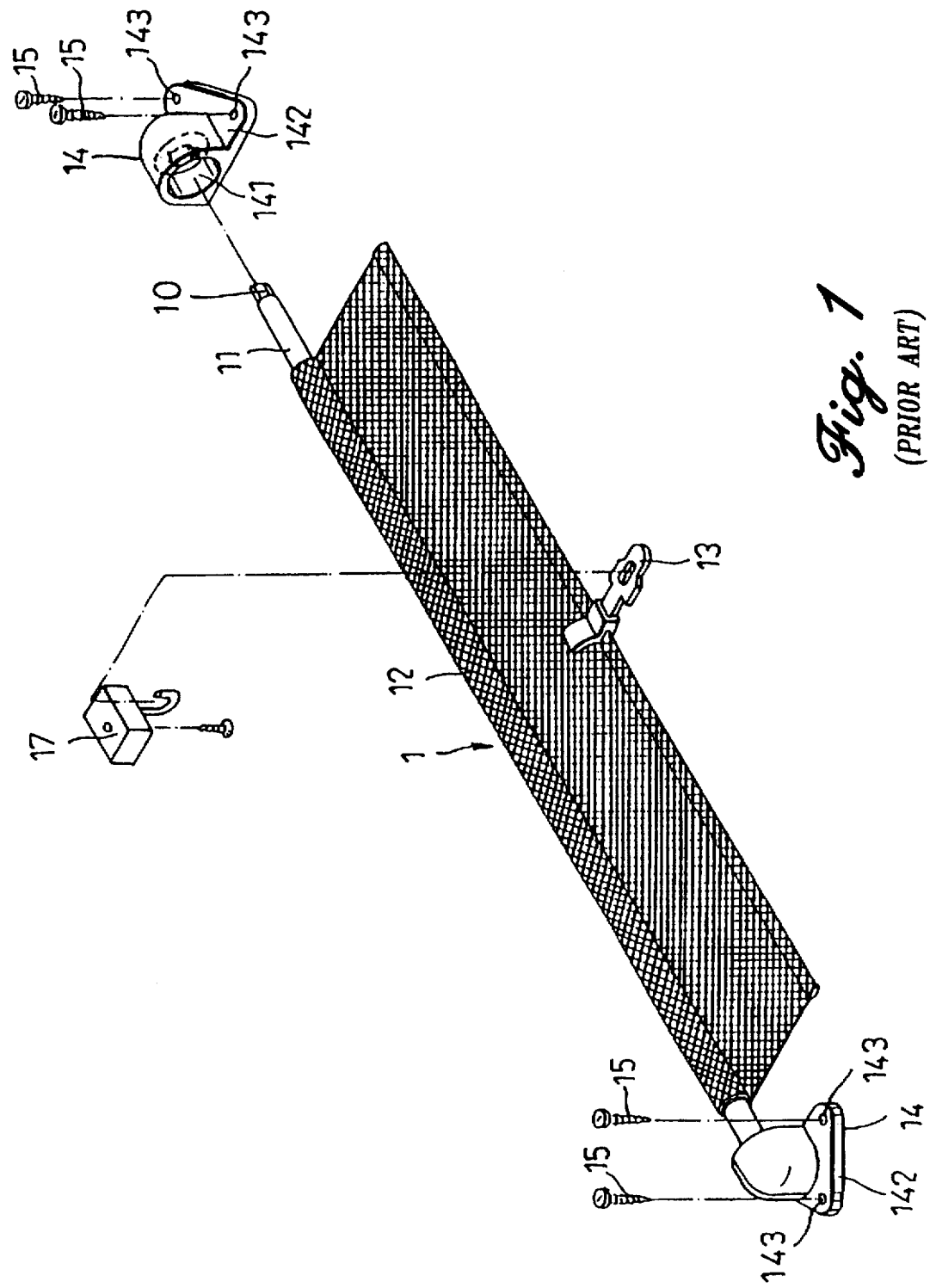
FIG. 1 is an exploded perspective view of a conventional sun screen.
Figure 2:
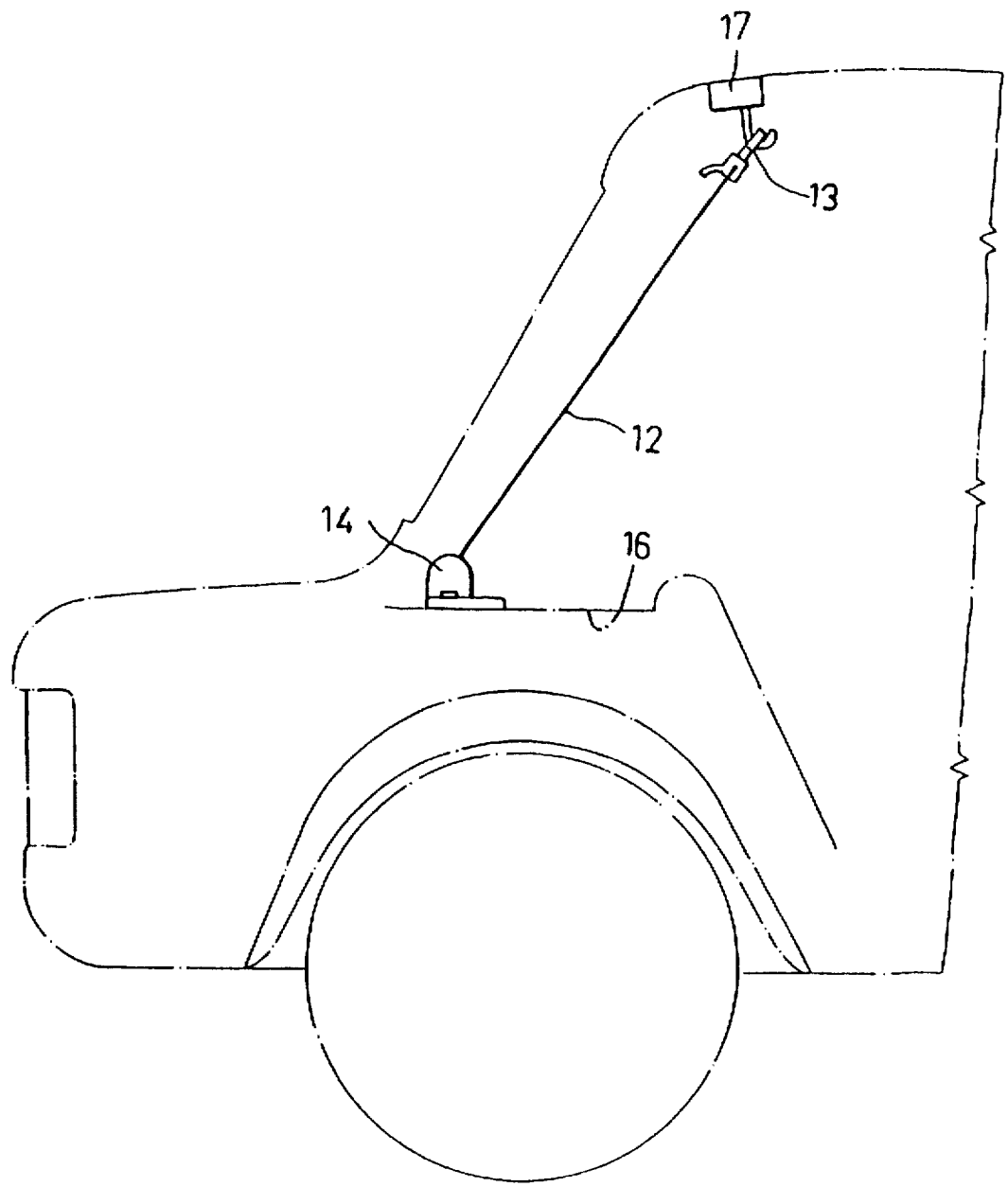
FIG. 2 is a schematic view which illustrates the conventional sun screen when in use.
Figure 3:
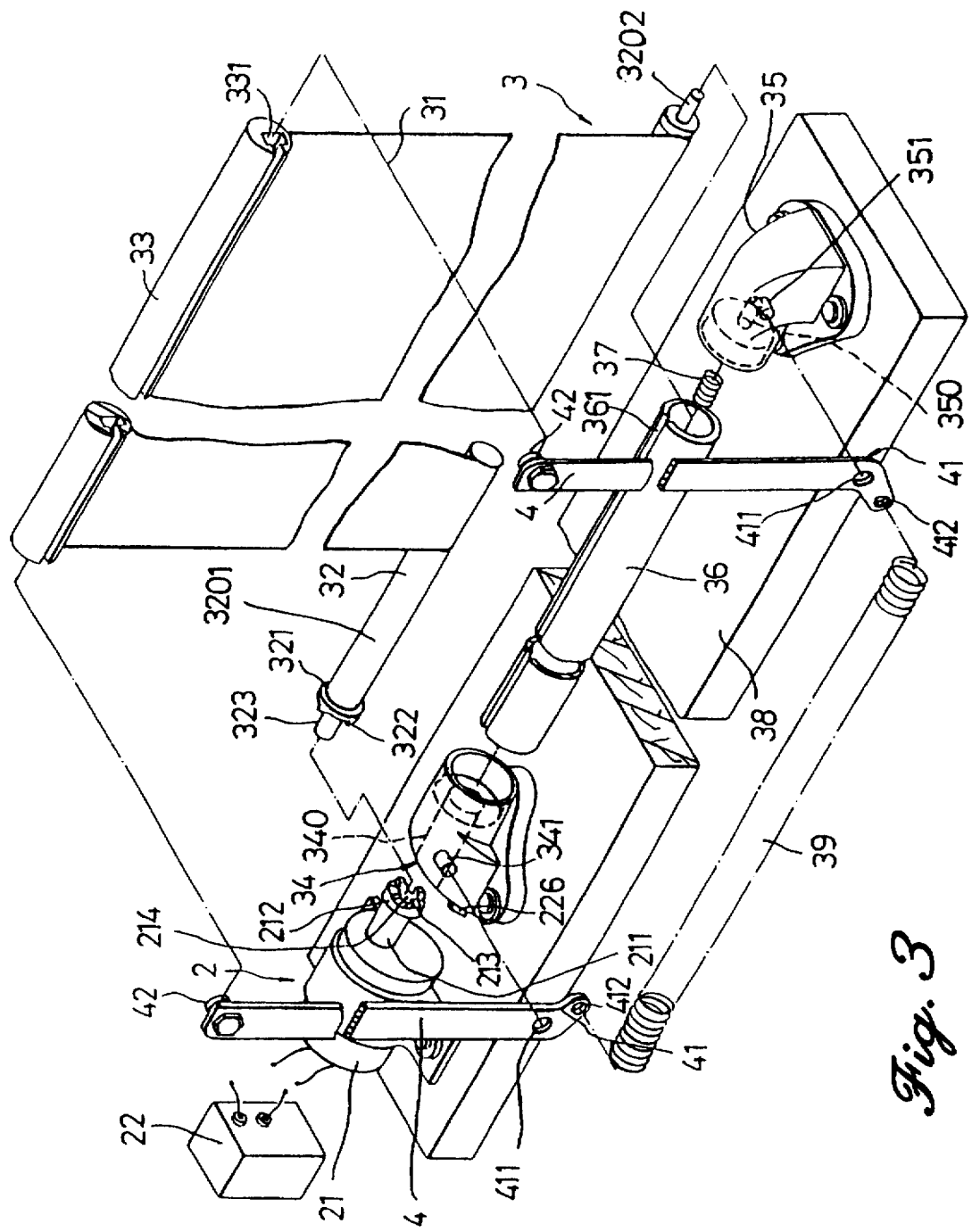
FIG. 3 is an exploded perspective view of the preferred embodiment of a motorized sun screen according to the present invention.
Figure 4:
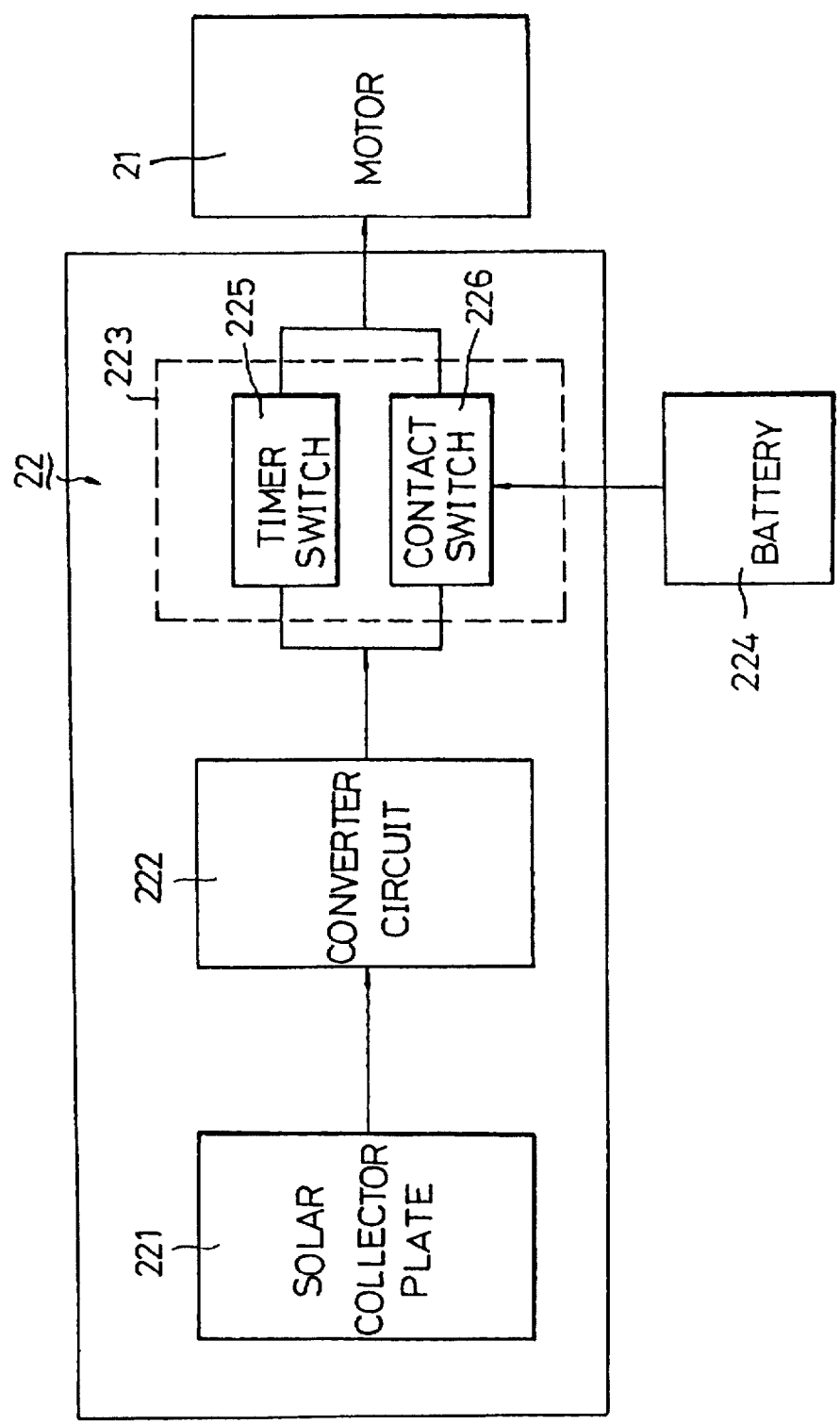
FIG. 4 is a schematic circuit block diagram of a drive unit of the preferred embodiment.
Figure 5:
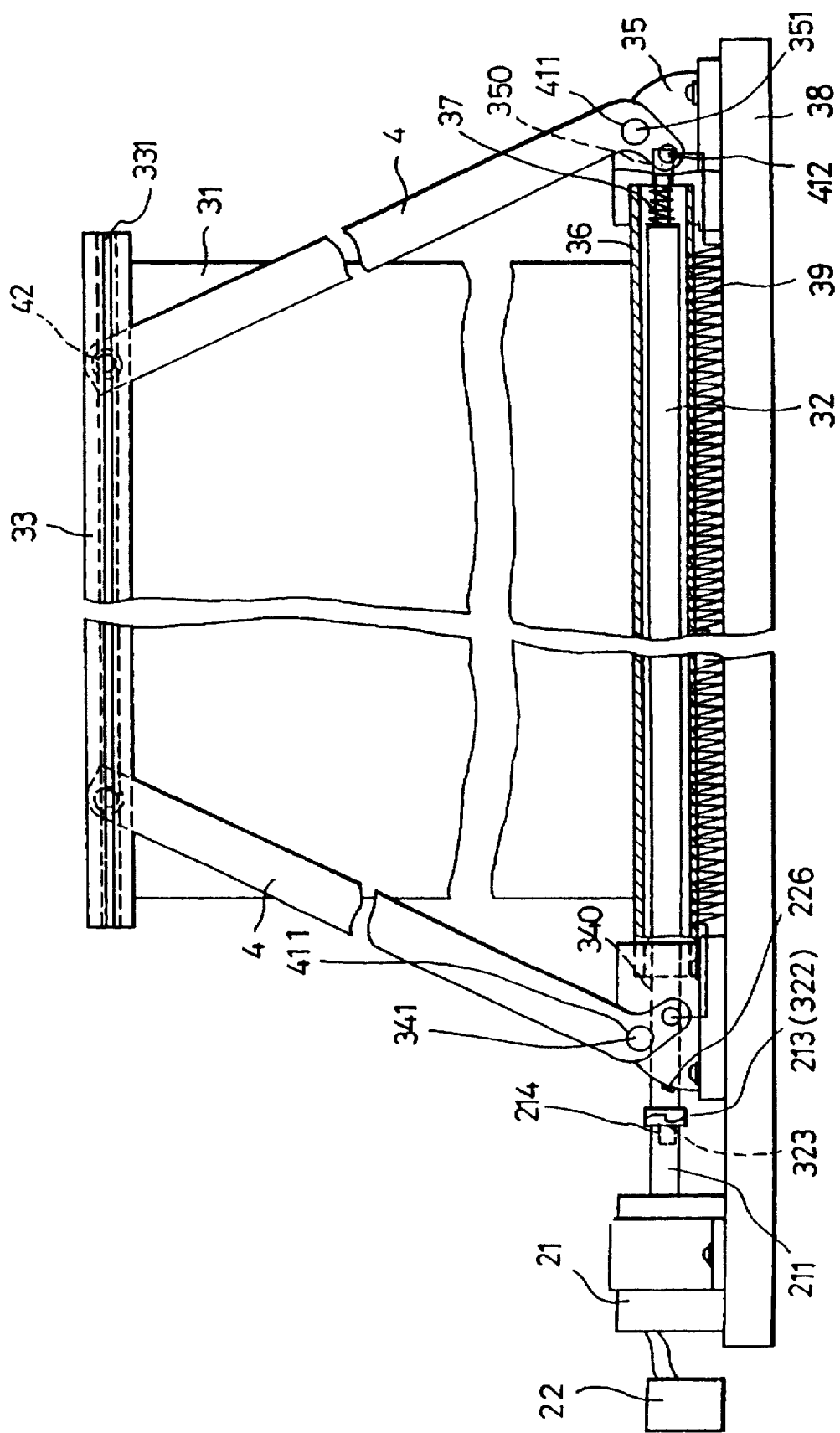
FIG. 5 is a schematic view of the preferred embodiment, illustrating the screen when in a stretched state.

Referring to FIGS. 3, 4 and 5, the preferred embodiment of a motorized sun screen according to the present invention is shown to comprise a base unit constituted by first and second retainers 34, 35, a tubular casing 36 and a base plate 38, a screen unit 3, a pair of pivot arms 4, an extension spring 39, a drive unit 2, and a clutch unit constituted by first and second ratchet wheels 212, 321 and a biasing member 37.

The first retainer 34 is formed with a horizontal cavity 340, while the second retainer 35 is formed with a horizontal blind bore 350. The first and second retainers 34, 35 are mounted spacedly and face-to-face on the base plate 38. Each of the first and second retainers 34, 35 has one side formed with a pivot pin 341, 351. The casing 36 is formed with an axially extending slit 361 and has two ends secured to the first and second retainers 34, 35, respectively.

The screen unit 3 includes a screen 31, a horizontal rod 32 and a horizontal shaft 33. The screen 31 has a bottom edge secured to the horizontal rod 32 and a top edge secured to the horizontal shaft 33. The horizontal rod 32 is disposed in the tubular casing 36 such that the top edge of the screen 31 extends out of the axially extending slit 361 in the casing 36. The horizontal rod 32 has a first end portion 3201 which extends slidably and rotatably through the horizontal cavity 340 in the first retainer 34, and a restricted second end portion 3202 which extends slidably and rotatably into the horizontal blind bore 350 in the second retainer 35. The horizontal shaft 33 is formed with an axially extending slide groove 331.

Each of the pivot arms 4 has a lower end portion 41 formed with a pivot hole 411 and a retaining hole 412 offset from the pivot hole 411. Each of the pivot arms 4 is mounted pivotally on a respective one of the first and second retainers 34, 35 by extending the respective pivot pin 341, 351 through the pivot hole 411 thereof. Each of the pivot arms 4 further has an upper end portion provided with a roller 42 which extends rollingly into the slide groove 331 in the horizontal shaft 33, thereby resulting in sliding engagement between the upper end portions of the pivot arms 4 and the horizontal shaft 33.

The extension spring 39 has two ends hooked onto the retaining hole 412 of a respective one of the pivot arms 4.

The drive unit 2 is mounted on the base plate 38 and includes a motor 21 with a rotatable drive shaft 211 which is coupled to the first end portion 3201 of the horizontal rod 32, and a control unit 22 which is connected electrically to the motor 21. The control unit 22 is operable so as to control operation of the motor 21 and the direction of rotation of the drive shaft 211. The motor 21 has a built-in speed reducing gear set (not shown) coupled to the drive shaft 211, thereby making it difficult to rotate the drive shaft 211 when the motor 21 is deactivated. As shown in FIG. 4, the control unit 22 includes a solar collector plate 221 for collecting solar energy, a converter circuit 222 which is connected to the solar collector plate 221 for converting the solar energy collected by the solar collector plate 221 into electrical energy, and a switch control circuit 223 which interconnects the converter circuit 222 and the motor 21. The switch control circuit 223 includes a timer switch 225 and a contact switch 226. The contact switch 226 is provided on the first retainer 34. The purpose of the timer switch 225 and the contact switch 226 will be described in greater detail in the succeeding paragraphs. The switch control circuit 223 is further connected to a battery 224 to permit operation of the preferred embodiment even when there is inadequate sun light.

Referring again to FIGS. 4 and 5, the clutch unit serves to couple the first end portion 3201 of the horizontal rod 32 with the drive shaft 211. The first ratchet wheel 212 is formed on a distal end of the drive shaft 211 and has a front side with a peripheral portion that is formed with ratchet teeth 213. The first ratchet wheel 212 is further formed with a central pivot hole 214. The second ratchet wheel 321 is formed on the first end portion 3201 of the horizontal rod 32 and has one side with a peripheral portion which is formed with ratchet teeth 322 that complement the ratchet teeth 213 on the first ratchet wheel 212. The second ratchet wheel 321 is further formed with an axial pin 323 which extends slidably into the pivot hole 214 in the first ratchet wheel 212. The biasing member 37, such as a coil spring, is sleeved on the second end portion 3202 of the horizontal rod 32 and biases the horizontal rod 32 toward the first retainer 34 such that the second ratchet wheel 321 meshes normally with the first ratchet wheel 212. The clutch unit enables the motor 21 to drive rotatably the horizontal rod 32 in only one direction.

FIG. 5 illustrates the preferred embodiment when the screen 31 is in a stretched state. As illustrated, the extension spring 39 is in a normal state and the pivot arms 4 form a relatively large angle relative to the base plate 38, thereby spacing the horizontal shaft 33 vertically from the base plate 38. When the control unit 22 is operated so as to activate the motor 21 to wind the screen 31 on the horizontal rod 32, the drive shaft 211 rotates in a first direction, wherein the first ratchet wheel 212 meshes with the second ratchet wheel 321 to enable the horizontal rod 32 to rotate axially with the drive shaft 211, thereby winding the screen 31 on the horizontal rod 32. As the screen 31 is wound on the horizontal rod 32, the horizontal shaft 33 descends toward the horizontal rod 32, thereby causing the pivot arms 4 to pivot toward each other and the rollers 42 on the pivot arms 4 to move toward each other along the slide groove 331 in the horizontal shaft 33. The extension spring 39 is stretched at this time. When the screen 31 is wound fully on the horizontal rod 32, as shown in FIG. 6, the lower end portion 41 of one of the pivot arms 4 actuates the contact switch 226 on the first retainer 34, thereby enabling the switch control circuit 223 to deactivate the motor 21.

The screen 31 can be maintained in the fully wound state in spite of the force of the extension spring 39 in view of the fact that the motor 21 has a built-in speed reducing gear set (not shown) which makes it difficult to rotate the drive shaft 211 when the motor 21 is deactivated. Moreover, the force exerted by the biasing member 37 must be sufficient to overcome the force of the extension spring 39 which is transmitted to the horizontal rod 32 via the pivot arms 4 and the screen 31 so as to prevent slippage between the first and second ratchet wheels 212, 321 when the screen 31 is wound on the horizontal rod 32.

Figure 6:
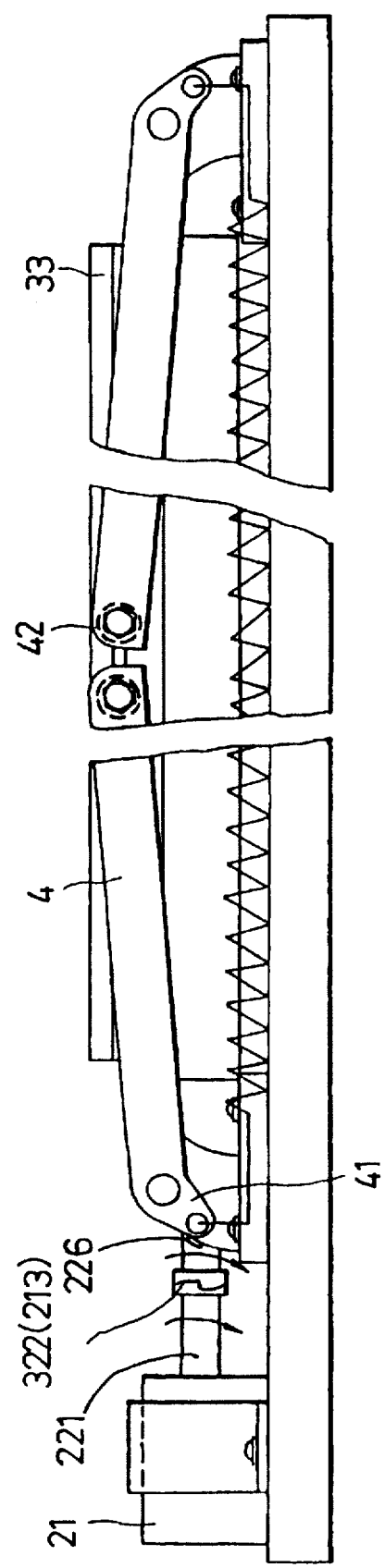
FIG. 6 is a schematic view of the preferred embodiment, illustrating the screen when wound on a horizontal rod.

FIG. 6 illustrates the preferred embodiment when the screen 31 is wound fully on the horizontal rod 32. As illustrated, the extension spring 39 is in a tensed state and the pivot arms 4 form a relatively small angle relative to the base plate 38. When the control unit 22 is operated so as to activate the motor 21 to unwind the screen 31 from the horizontal rod 32, the drive shaft 211 rotates in a second direction opposite to the first direction, wherein the first ratchet wheel 212 is incapable of transferring power output of the motor 21 to the horizontal rod 32 via the second ratchet wheel 321, thereby resulting in slipping between the first ratchet wheel 212 and the second ratchet wheel 321. The slipping of the first ratchet wheel 212 and the second ratchet wheel 321 disconnects the horizontal rod 32 from the drive shaft 211, thereby permitting contraction of the extension spring 39. The contraction of the extension spring 39 causes pivoting movement of the pivot arms 4 away from each other, thereby resulting in movement of the rollers 42 on the pivot arms 4 away from each other along the slide groove 331 in the horizontal shaft 33 and in vertical ascent of the horizontal shaft 33 so as to stretch the screen 31, as shown in FIG. 5. After a preset time period, during which the screen 31 has been moved from the fully wound position to the fully stretched position, the timer switch 225 automatically deactivates the motor 21, thereby maintaining the screen 31 in the stretched state.

The specific configuration of the clutch unit should not be deemed critical to the present invention. The structure of the clutch unit can be modified as long as the drive shaft can be coupled to the horizontal rod when the screen is wound on the horizontal rod, and as long as the drive shaft can be disconnected from the horizontal rod when the screen is being stretched.

It has thus been shown that the sun screen of this invention can be conveniently operated so as to cover or uncover a vehicle window. The object of this invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A motorized sun screen for covering a vehicle window, comprising:

a base unit;

a screen unit including a lower horizontal rod mounted rotatably on said base unit, an upper horizontal shaft, and a screen with a bottom edge connected to said horizontal rod and a top edge connected to said horizontal shaft;

a pair of pivot arms, each of which has a lower end portion mounted pivotally on said base unit and an upper end portion slidably engaging said horizontal shaft;

an extension spring having two ends connected respectively to pivot arms at said lower end portions; and a drive unit mounted on said base unit, said drive unit including a motor with a rotatable drive shaft which is coupled to one end of said horizontal rod, said motor being operable in a first mode, wherein said motor rotates said drive shaft to permit said extension spring to contract, thereby biasing said pivot arms such that said upper end portions of said pivot arms pivot away from each other to move said horizontal shaft upwardly and stretch said screen, and in a second mode, wherein said motor rotates said drive shaft to result in rotation of said horizontal rod, thereby causing said screen to wind on said horizontal rod, which causes said horizontal shaft to move downwardly and said upper end portions of said pivot arms to move toward each other resulting in tensing of said extension spring.

2. The motorized sun screen as claimed in claim 1, further comprising a clutch unit, including a first ratchet wheel connected to said drive shaft and a second ratchet wheel connected to said horizontal rod, said clutch unit coupling said one end of said horizontal rod with said drive shaft, said clutch unit disconnecting said horizontal rod from said drive shaft when said first ratchet wheel and said second ratchet wheel are disconnected to permit contraction of said extension spring and movement of said upper end portions of said pivot arms away from each other so as to stretch said screen when said motor is operated in the first mode, said clutch unit connecting said horizontal rod to said drive shaft for rotating said horizontal rod, thereby winding said screen on said horizontal rod and moving said upper end portions of said pivot arms toward each other so as to result in tensing of said extension spring when said motor is operated in the second mode.

3. The motorized sun screen as claimed in claim 1, wherein said drive unit further includes a control unit connected electrically to said motor, said control unit being operable so as to control operation of said motor in the first and second modes and including a solar collector plate for collecting solar energy, a converter circuit connected to said solar collector plate for converting the solar energy collected by said solar collector plate into electrical energy, and a switch control circuit which interconnects said converter circuit and said motor.

4. The motorized sun screen as claimed in claim 3, wherein said switch control circuit includes a timer switch for deactivating automatically said motor after a preset time period during operation of said motor in the first mode.

5. The motorized sun screen as claimed in claim 3, wherein said switch control circuit includes a contact switch disposed on said base unit and actuated by one of said pivot arms for deactivating said motor when said screen is wound fully on said horizontal rod.

6. A motorized sun screen for covering a vehicle window, comprising:

a base unit;

a screen unit including a lower horizontal rod mounted rotatably on said base unit, an upper horizontal shaft, and a screen with a bottom edge connected to said horizontal rod and a top edge connected to said horizontal shaft;

a pair of pivot arms, each of which has a lower end portion mounted pivotally on said base unit and an upper end portion slidably engaging said horizontal shaft; and a drive unit mounted on said base unit, said drive unit including a motor with a rotatable drive shaft which is coupled to one end of said horizontal rod, said motor being operable in a first mode, wherein said motor rotates said drive shaft to cause rotation of said horizontal rod for moving said upper end portions of said pivot arms away from each other and for moving said horizontal shaft upwardly to stretch said screen, and in a second mode, wherein said motor rotates drive shaft to cause rotation of said horizontal portions of said pivot arms to move toward each other and for winding said screen on said horizontal rod, said drive unit further including a control unit connected electrically to said motor, said control unit being operable so as to control operation of said motor in the first and second modes and including a solar collector plate for collecting solar energy, a converter circuit connected to said solar collector plate for converting the solar energy collected by said solar collector plate into electrical energy, and a switch control circuit which interconnects said converter circuit and said motor.

7. The motorized sun screen as claimed in claim 6, wherein said switch control circuit includes a timer switch for deactivating automatically said motor after a preset time period during operation of said motor in the first mode.

8. The motorized sun screen as claimed in claim 6, wherein said switch control circuit includes a contact switch disposed on said base unit and actuated by one of said pivot arms for deactivating said motor when said screen is wound fully on said horizontal rod.

* * * * *